(12) United States Patent
Chung et al.

(10) Patent No.: US 12,294,094 B2
(45) Date of Patent: May 6, 2025

(54) BATTERY CASE

(71) Applicant: POSCO, Pohang-si (KR)

(72) Inventors: Gi-Suk Chung, Incheon (KR);
Sang-Kwon Wee, Incheon (KR);
Don-Gun Kim, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 826 days.

(21) Appl. No.: 17/296,876

(22) PCT Filed: Nov. 26, 2019

(86) PCT No.: PCT/KR2019/016341
§ 371 (c)(1),
(2) Date: May 25, 2021

(87) PCT Pub. No.: WO2020/111714
PCT Pub. Date: Jun. 4, 2020

(65) Prior Publication Data
US 2022/0029224 A1    Jan. 27, 2022

(30) Foreign Application Priority Data
Nov. 30, 2018    (KR) .......................... 10-2018-0151870

(51) Int. Cl.
*H01M 50/119*    (2021.01)
*H01M 50/204*    (2021.01)
(Continued)

(52) U.S. Cl.
CPC ....... *H01M 50/119* (2021.01); *H01M 50/204* (2021.01); *H01M 50/224* (2021.01);
(Continued)

(58) Field of Classification Search
CPC ............. H01M 50/119; H01M 50/249; H01M 50/242; H01M 50/224; H01M 50/204
See application file for complete search history.

(56) References Cited

U.S. PATENT DOCUMENTS 7,407,219 B2 *   8/2008   Glasgow ................. B60R 19/18
                                                              293/133
8,637,173 B2     1/2014   Koh
(Continued)

FOREIGN PATENT DOCUMENTS

CA       3030992 A1    2/2018
CN       107591500 A   1/2018
(Continued)

OTHER PUBLICATIONS

International Search Report and Written Opinion issued in corresponding International Application No. PCT/KR2019/016341 dated Mar. 4, 2020, with partial English translation.
(Continued)

*Primary Examiner* — Jonathan G Jelsma
(74) *Attorney, Agent, or Firm* — Morgan, Lewis & Bockius LLP

(57) ABSTRACT

The present invention relates to a battery case which is made from a steel material, thereby providing a cross-section similar to that of an extruded material and having improved impact resistance properties, and at the same time, enabling the reduction of costs through the integration of components, the battery case comprising a case main body having a plate and a lateral frame enclosing the plate, wherein the lateral frame comprises a hollow part inside thereof, a reinforcement part which traverses the hollow part at a portion between side walls on both sides, or protrudes into the hollow part from at least one of the side walls, and a shock absorption part which is formed by the reinforcement part being bent or curved.

6 Claims, 5 Drawing Sheets

(51) Int. Cl.
  *H01M 50/224* (2021.01)
  *H01M 50/227* (2021.01)
  *H01M 50/242* (2021.01)
  *H01M 50/249* (2021.01)
(52) U.S. Cl.
  CPC ....... *H01M 50/227* (2021.01); *H01M 50/242* (2021.01); *H01M 50/249* (2021.01)

(56) References Cited

U.S. PATENT DOCUMENTS

| | | | |
|---|---|---|---|
| 9,056,631 B2 | 6/2015 | Nakamori | |
| 10,632,857 B2* | 4/2020 | Matecki | B60L 50/64 |
| 2015/0372321 A1 | 12/2015 | Araki et al. | |
| 2017/0305249 A1 | 10/2017 | Hara | |
| 2017/0327153 A1* | 11/2017 | Kim | B62D 29/007 |
| 2018/0013111 A1 | 1/2018 | Wuensche et al. | |
| 2018/0194213 A1 | 7/2018 | Kobayashi | |
| 2019/0157642 A1 | 5/2019 | Toyota | |
| 2019/0221797 A1 | 7/2019 | Nierhoff et al. | |
| 2019/0381899 A1 | 12/2019 | Gunther et al. | |

FOREIGN PATENT DOCUMENTS

| | | |
|---|---|---|
| CN | 108482282 A | 9/2018 |
| CN | 108859712 A | 11/2018 |
| DE | 102016120826 A1 | 5/2018 |
| EP | 2332761 B1 | 8/2012 |
| JP | 2006-137988 A | 6/2006 |
| JP | 2016-141316 A | 8/2016 |
| JP | 2017-124697 A | 7/2017 |
| JP | 2017-124698 A | 7/2017 |
| JP | 2017-193288 A | 10/2017 |
| JP | 2018-6314 A | 1/2018 |
| JP | 2018-113153 A | 7/2018 |
| JP | 2018-188106 A | 11/2018 |
| JP | 2019-96385 A | 6/2019 |
| KR | 20-1996-0027802 U | 3/1998 |
| KR | 10-1149700 B1 | 5/2012 |
| KR | 10-1274903 B1 | 6/2013 |
| KR | 10-2015-0146412 A | 12/2015 |
| WO | 2018/029167 A1 | 2/2018 |

OTHER PUBLICATIONS

Japanese Office Action dated May 31, 2022 issued in U.S. Patent Application No. 2021-525798.
Extended European Search Report dated Feb. 8, 2022 issued in European Patent Application No. 19890911.1.
Chinese Office Action dated Sep. 26, 2022 issued in Chinese Patent Application No. 201980078170.2 (with English translation).

* cited by examiner

[Figure 1]
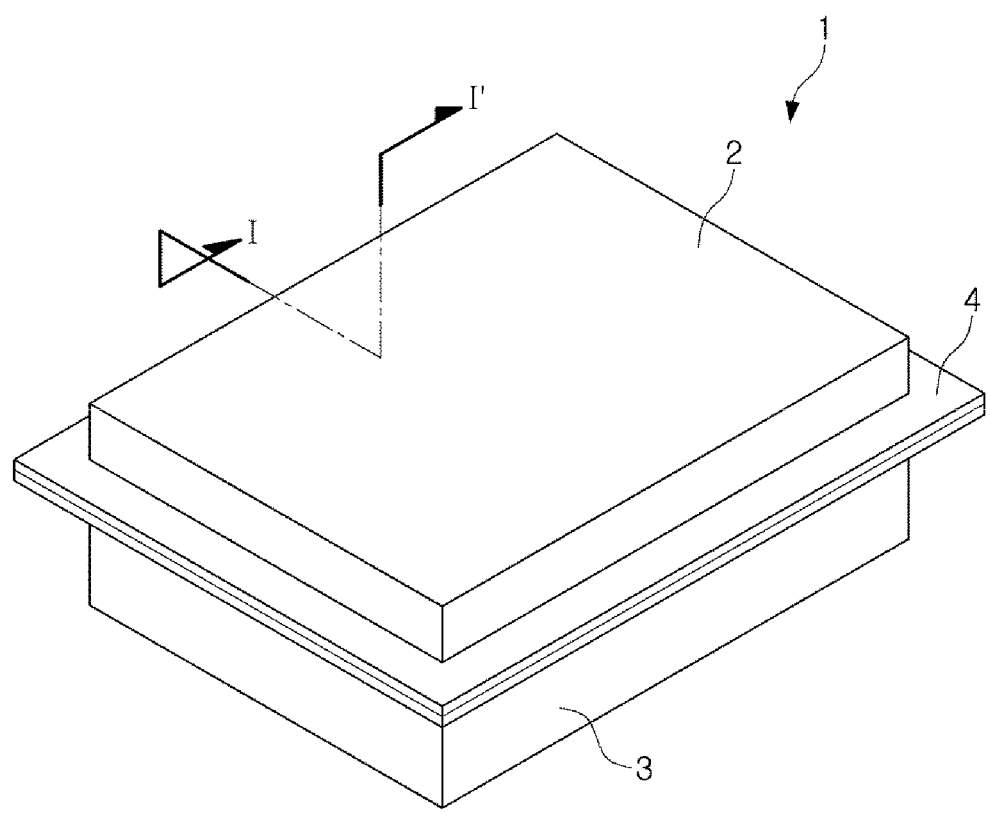

[Figure 2]
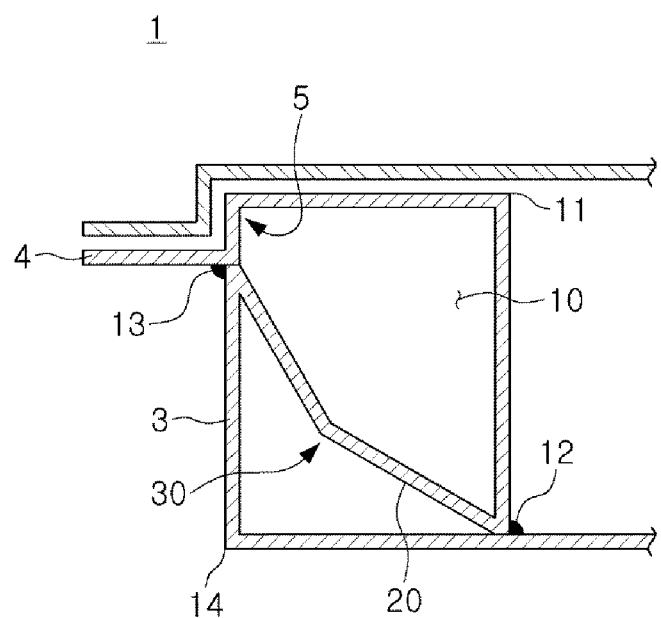
I-I'

[Figure 3]
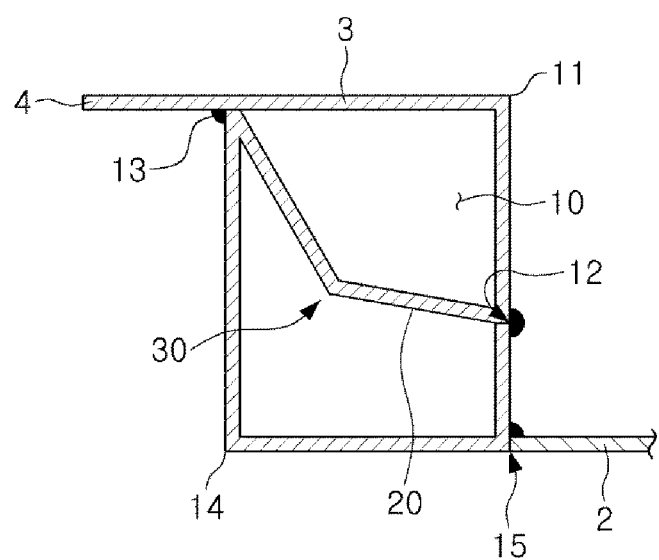

[Figure 4]
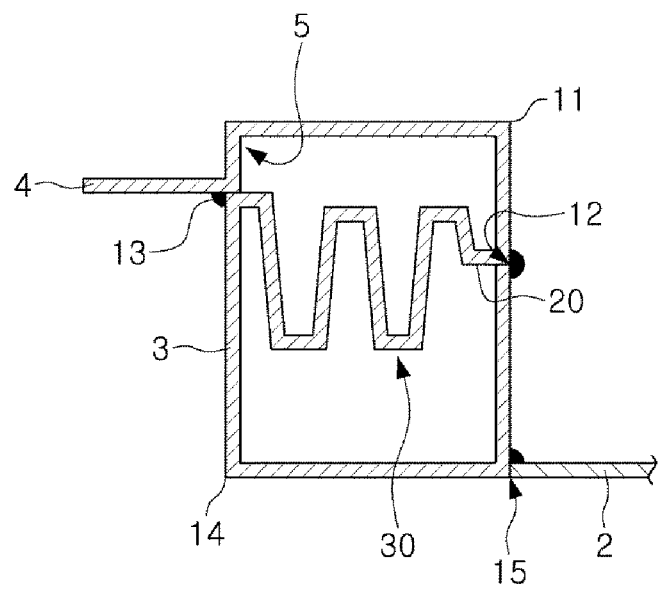

[Figure 5]
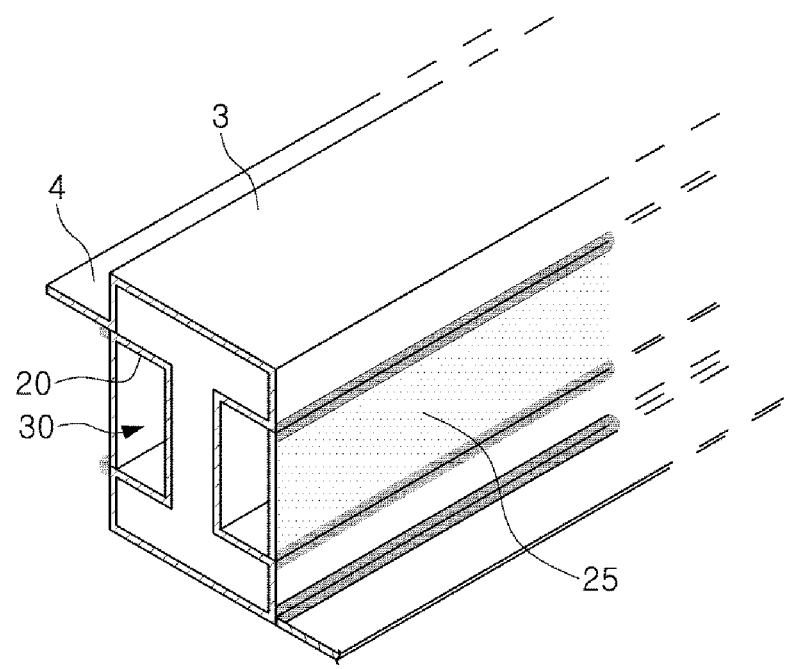

BATTERY CASE

CROSS REFERENCE

This application is the U.S. National Phase under 35 U.S.C. § 371 of International Application No. PCT/KR2019/016341 filed on 26 Nov. 2019, which claims the benefit of Korean Application No. 10-2018-0151870 filed on 30 Nov. 2018, the entire contents of each are hereby incorporated by reference.

TECHNICAL FIELD

The present disclosure relates to a battery case made of a steel material and capable of improving impact resistance properties.

BACKGROUND ART

A battery installed in a vehicle such as an electric vehicle or a hybrid vehicle may lead to fire and explosion in an event of a vehicle collision, resulting in a serious danger to drivers and passengers. In order to prevent this, a reinforcing member is provided in the battery itself, in addition to a collision reinforcing member of a vehicle body to prepare for a collision accident.

The reinforcing member of the battery can be mainly assembled inside or outside of the battery case.

For example, when aluminum is applied, a side wall itself of the battery case may be formed of an extruded material, and in the case of a steel material, a reinforcing member is bonded to an inside of the battery case.

When formed of an extruded material of aluminum, a reinforcing member can be easily manufactured in various shapes, but it is relatively expensive and has lower strength than the steel material, so that the thickness thereof becomes thicker, thereby limiting weight reduction.

Meanwhile, in the case of a steel material, an ultra-high strength material having a tensile strength of about 980 MPa or more is applied to reduce weight, and such an ultra-high strength material has a problem that is difficult to form and many springbacks may occur. In order to improve springback, several or dozens of correction times are required, and in some cases, there is a problem in that assembly is not easy due to inconsistent parallelism between components.

As related prior art, there is provided an invention disclosed in Japanese Patent Application Laid-Open No. 2017-193288 A (published on Oct. 26, 2017).

DISCLOSURE

Technical Problem

Accordingly, an aspect of the present disclosure is to provide a battery case which is made from a steel material, thereby providing a cross-section, similar to that of an aluminum extruded material and having improved impact resistance properties, and at the same time, enabling reduction of costs through integration of components.

Technical Solution

According to an aspect of the present disclosure, a battery case includes a case body having a plate and a lateral frame enclosing the plate, wherein the lateral frame includes a first side wall and a second side wall having a hollow part therebetween; and a reinforcing part traversing the hollow part between the first side wall and the second side wall to connect the first side wall and the second wall, or protruding into the hollow part from at least one of the first side wall and the second side wall, wherein the reinforcing part includes a shock absorption part which is formed by being bent or curved.

Advantageous Effects

As described above, according to the present disclosure, by forming a shock absorption part on the lateral frame itself of the battery case, high deformation resistance against an impact load on the side surface may be secured, and at the same time, ultra-high strength steel of about 980 MPa or more can be applied to the battery case, such that there is an effect that can secure additional weight reduction.

In addition, according to the present disclosure, when a steel material is applied to a battery case, assembly properties can be significantly improved as compared to the case of a method of bonding a reinforcing member in the related art, and costs related to molding, processes, and the like, can be significantly reduced by dramatically reducing the number of parts.

DESCRIPTION OF DRAWINGS

FIG. 1 is a perspective view of a battery case.

FIG. 2 is a cross-sectional view taken along line A-A of FIG. 1 and is a cross-sectional view of a lateral frame of a battery case according to an embodiment of the present disclosure.

FIG. 3 is a cross-sectional view illustrating a modified example of a lateral frame of a battery case according to an embodiment of the present disclosure.

FIG. 4 is a cross-sectional view illustrating another modified example of a lateral frame of a battery case according to an embodiment of the present disclosure.

FIG. 5 is a cross-sectional view illustrating another modified example of a lateral frame of a battery case according to an embodiment of the present disclosure.

BEST MODE FOR INVENTION

Hereinafter, the present disclosure will be described in detail. In adding reference numerals to elements of each drawing, it should be noted that the same elements are assigned the same numerals as possible even if they are indicated on different drawings. In addition, in describing the present invention, when it is determined that a detailed description of a related known configuration or function may obscure the subject matter of the present disclosure, a detailed description thereof will be omitted.

FIG. 1 is a perspective view of a battery case, and FIG. 2 is a cross-sectional view taken along line A-A of FIG. 1 and is a cross-sectional view of a lateral frame of a battery case according to an embodiment of the present disclosure.

According to an embodiment of the present disclosure, a battery case includes a case body 1 having a plate 2 and a lateral frame 3 surrounding the plate, wherein the lateral frame 3 includes a first side wall and a second side wall having a hollow part 10 interposed therebetween; and a reinforcing part 20 which traverses the hollow part between the side walls to connect the first side wall and the second wall, or protrudes into the hollow part from at least one of the first side wall and the second side wall, wherein the reinforcement part includes a shock absorption part which is formed by being bent or curved.

The battery case may be fixedly installed on an under floor panel (not shown) constituting the vehicle body. The battery case may have a substantially rectangular parallelepiped shape, and a plurality of battery cells (not shown) may be accommodated therein.

The battery case may include a pair of case bodies 1, for example, an upper case body and a lower case body, and these upper and lower case bodies may be combined to form a space therein.

For example, the upper case body and the lower case body have flange parts 4 formed along respective edges, and these flange parts may overlap each other so that they may be assembled by fasteners such as bolts and nuts.

The upper case body may be formed of high-strength plastic or light metal such as aluminum, which can secure sufficient strength while reducing weight and cost. When the material is plastic, the upper case body may be formed by injection molding or compression molding, and when the material is metal, the upper case body may be formed into a predetermined shape by press processing, or the like.

Since the lower case body can be directly exposed externally and is likely to be damaged or deformed by external foreign substances, it is preferable to be formed of metal in order to more effectively protect a battery cell. In this case, the lower case body may be made by forming a steel material having an appropriate strength, for example, a material such as an ultra-high strength steel material having a tensile strength of about 980 MPa or more for weight reduction into a predetermined shape by press processing, or the like.

Hereinafter, for convenience, the lower case body represents the case body 1, and the battery case according to the present disclosure is described. In other words, the upper case body may include all the same components as the lower case body and the same structure may also be applied.

The case body 1 includes a plate 2 and a lateral frame 3 surrounding the plate. When such a case body is applied as a lower case body, the plate may act as a floor member supporting a battery cell, and when the case body is applied as an upper case body, the plate material may act as a cover member covering the battery.

The lateral frame 3 may be changed in a height dimension by interlocking with the size of a battery cell embedded in the case body 1. At least four lateral frames are provided, and both end parts of each of the lateral frames are cut obliquely at a predetermined angle (e.g., approximately 45 degrees), and contact the corresponding other lateral frames at both end portions, respectively, and then may be bonded by welding such as laser welding, $CO_2$ welding, or the like.

The lateral frame 3 of the case body 1 may have a closed cross-section of, for example, a rectangular shape as a whole, and accordingly, a first side wall and a second side wall having a hollow part 10 interposed therebetween may be formed.

In addition, a reinforcing part 20 supporting a side load is disposed in the hollow portion to connect the first side wall and the second side wall traversing the hollow part between the first side wall and the second side wall, thereby partitioning the hollow part into at least two spaces.

Optionally, a flange part 4, for securing water tightness by closely coupling the case body 1 to another case body, for example, a lower case body having a lateral frame in close contact with the upper case body, may be formed on the lateral frame 3. Due to this flange part, the lateral frame may be provided with a stepped part 5.

The lateral frame 3 of the battery case according to an embodiment of the present disclosure is preferably formed by processing a metal material such as an ultra-high strength steel material having a tensile strength of about 980 MPa or more by roll forming, which facilitates adjustment of the springback.

In the case of forming by using roll forming as described above, by bending the plate-shaped material several times, it is possible to provide a cross-sectional shape and collision resistance characteristics, similar to those of an aluminum extruded material.

Another point of the material meeting the bent point of the material may be bonded to the corresponding bent point by welding, or the like to form a hollow part 10 in addition to a rectangular closed cross-section.

More specifically, referring to FIG. 2, a material extending horizontally in a width direction of the lateral frame starting from an upper edge of one side of the lateral frame 3 is bent at a first bending point 11 to be substantially perpendicular to a first direction (clockwise in FIG. 2), descends in a height direction and is then bent at a second bending point 12 at a predetermined angle in the first direction, is bent or curved in an arbitrary direction and at an arbitrary angle to form a shock absorption part 30 and is then bent at a third bending point 13 in the second direction (counterclockwise in FIG. 2) opposite to the first direction, and descends in a height direction and is then bent at a fourth bending point 14 to be substantially perpendicular to the second direction and extends in a horizontal direction.

A material extending in the horizontal direction after being bent at the fourth bending point 14 may be bonded to the second bending point 12 by welding, or the like, to form a lower edge of the other side of the lateral frame 3. If the material continues to extend following bonding, such as welding, or the like, this extension part may at least partially constitute a floor member or a cover member.

The third bending point 13 may be bonded to a starting point or a portion adjacent to the starting point of the material by welding, or the like, to form an upper edge of one side of the lateral frame.

When a stepped part 5 for the flange part 4 is to be formed, before extending horizontally in the width direction of the lateral frame 3, the material may be bent in the second direction and then bent in the first direction to form a stepped part, and an upper edge and a flange part of one side of the lateral frame may be formed. In this case, the third bending point 13 may be bonded to the stepped part by welding, or the like.

FIG. 3 is a cross-sectional view showing a modified example of a lateral frame of a battery case according to an embodiment of the present disclosure.

As shown in FIG. 3, a material extending in a horizontal direction after being bent at a fourth bending point 14 is bent at a fifth bending point 15 to be approximately perpendicular to a second direction (counterclockwise in FIG. 3), and an end point of the material may be bonded to the second bending point 12 by welding, or the like.

In addition, the fifth bending point 15 may be bonded to an end portion of the plate 2, acting as a floor member or a cover member of the case body 1 by welding, or the like to form a lower edge of the other side of the lateral frame 3.

Meanwhile, the third bending point 13 may be bonded to a starting point or a portion adjacent to the starting point of the material by welding, or the like to form an upper edge of one side of the lateral frame 3. Depending on a bonding position of the third bending point 13, the flange part 4 may be present or the flange part may be removed.

FIG. 4 is a cross-sectional view illustrating another modified example of a lateral frame of a battery case according to an embodiment of the present disclosure.

As illustrated in FIGS. 2 to 4, a position, a height, an angle or inclination, or the like, of a reinforcing part 20 in a lateral frame 3 can be adjusted.

In addition, a shock absorption part 30 formed on the reinforcing part 20 may be formed by bending the reinforcing part once or curving it once in the simplest manner. In addition thereto, the shock absorption part may be implemented in various shapes, and for example, it may have a curved shape by being bent into a substantially wave shape or bent into an approximately sawtooth shape. In this case, resistance force to a side impact load can be greatly strengthened.

As described above, in the battery case according to an embodiment of the present disclosure, a shape for absorbing shock is formed on the lateral frame itself of the case body without increasing a thickness or adding components, thereby ensuring high deformation resistance against the side impact load.

FIG. 5 is a cross-sectional view illustrating another modified example of a lateral frame of a battery case according to an embodiment of the present disclosure.

In the modified example of FIG. 5, after a material is bent at a right angle at all bending points, and an entire cross-sectional shape of a lateral frame 3 is formed in an approximately I-shape, an auxiliary reinforcing member 25 is bonded between the bending points protruding laterally and facing each other by welding, or the like. This modified example can also greatly improve the shock absorption capacity.

As in the modified examples in FIGS. 4 and 5, by adding an additional bending point or a curved shape, an auxiliary reinforcing member, and the like, to the reinforcing part 20 in the battery case according to an embodiment of the present disclosure, high deformation resistance against the impact load on the lateral surface may be further maximized.

As described above, according to the present disclosure, by forming a shock absorption part on the lateral frame itself of the battery case, high deformation resistance against the impact load on the lateral surface may be secured, and at the same time, ultra-high strength steel of about 980 MPa or more can be applied to the battery case, such that there is an effect of securing additional weight reduction.

In addition, according to the present disclosure, when a steel material is applied to a battery case, assembling property can be significantly improved as compared to a method of bonding a reinforcing member in the related art, and costs related to molding, processes, and the like can be significantly reduced by dramatically reducing the number of parts.

The above description is merely illustrative of the technical idea of the present invention, and those of ordinary skill in the art to which the present invention pertains will be able to make various modifications and variations without departing from the essential characteristics of the present disclosure.

Accordingly, the embodiments disclosed in the specification and drawings are not intended to limit the technical idea of the present invention, but to explain the technical idea, and the scope of the technical idea of the present invention is not limited by these embodiments. The scope of protection of the present invention should be interpreted by the following claims, and all technical ideas within the scope equivalent thereto should be construed as being included in the scope of the present invention.

INDUSTRIAL AVAILABILITY

As described above, the present invention is useful for configuring a battery mounted on a vehicle such as an electric vehicle or a hybrid vehicle.

The invention claimed is:

1. A battery case, comprising:
a plate; and
a lateral frame enclosing the plate,
wherein the lateral frame comprises,
a first wall and a second wall, a third wall, and a fourth wall forming a hollow part therebetween; and
a reinforcing part formed by traversing the hollow part to connect the second wall and the third wall,
wherein the reinforcing part comprises a shock absorption part formed by being bent,
wherein the first wall extends horizontally to a first bending point,
wherein the second wall is bent clockwise at the first bending point and then extends to a second bending point,
wherein the reinforcing part is bent at the second bending point and then extends to the third bending point,
wherein the third wall is bent counterclockwise at the third bending point and then extends to a fourth bending point,
wherein the fourth wall extends horizontally from the fourth bending point,
wherein the first to the fourth walls have a closed cross-section of a rectangular shape,
wherein the fourth wall is bonded to the second bending point to form a lower edge of the lateral frame,
wherein the fourth wall comprises an extension part that extends beyond a bonding point with the second wall and the extension part at least partially constitutes a floor or a cover of the battery case.

2. The battery case of claim 1, wherein a flange portion is formed on the lateral frame.

3. The battery case of claim 1, wherein the lateral frame is formed by bending and bonding a metal material by roll forming.

4. The battery case of claim 3, wherein the material is a steel material having tensile strength of 980 MPa or more.

5. The battery case of claim 1,
wherein the third bending point is bonded to a starting point or a portion adjacent to the starting point of the first wall to form an upper edge of the lateral frame.

6. The battery case of claim 1, wherein the lateral frame, prior to the first wall, is bent counterclockwise and then clockwise to form a flange part while forming a stepped part,
wherein the third bending point is bonded to the stepped part, to form an upper edge of the lateral frame.

* * * * *